United States Patent [19]

Engle

[11] Patent Number: 4,673,063

[45] Date of Patent: Jun. 16, 1987

[54] HYDRAULIC SHOCK ABSORBER HAVING RESERVE LIQUID SUPPLY CHAMBER AND INDICATOR

[75] Inventor: Thomas H. Engle, Cape Vincent, N.Y.

[73] Assignee: General Signal Corporation, Stamford, Conn.

[21] Appl. No.: 861,948

[22] Filed: May 12, 1986

[51] Int. Cl.⁴ .......................... F16D 66/00; G01L 7/16
[52] U.S. Cl. .................................. 188/1.11; 116/272; 137/557; 188/322.11
[58] Field of Search ..................... 73/11; 116/272, 276; 137/557; 188/1.11, 322.11, 322.22; 267/124, 159

[56] References Cited

U.S. PATENT DOCUMENTS 3,833,094 9/1974 Grossman ........................ 188/1.11
4,141,263 2/1979 Ellington ............................. 73/11
4,499,846 2/1985 Bergeron et al. ................... 116/272

Primary Examiner—Duane A. Reger
Attorney, Agent, or Firm—Robert R. Hubbard; Milton E. Kleinman

[57] ABSTRACT

A shock absorber has a reserve fluid supply chamber near one end and a cylindrical housing portion adjoining the reserve supply chamber containing a spring for biasing a piston to pressurize liquid in the reserve supply chamber. The piston moves a shaft axially carrying an indicating disc, the periphery of which can be viewed through viewing openings in the cylindrical housing when the supply chamber liquid is exhausted. Snap action of the indicating disc is accomplished by a detent ring in a groove about the periphery of the disc and a complimentary groove about the inner periphery of a transparent sleeve that also seals the viewing opening against dust and the like.

4 Claims, 1 Drawing Figure

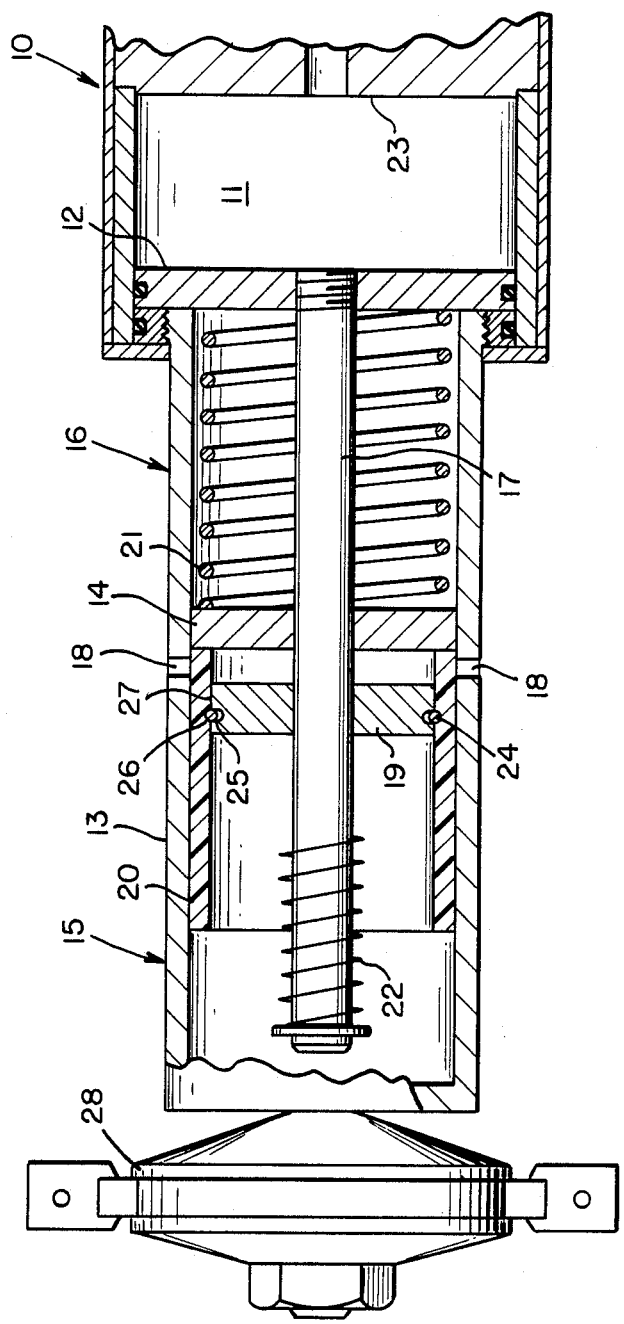

HYDRAULIC SHOCK ABSORBER HAVING RESERVE LIQUID SUPPLY CHAMBER AND INDICATOR

BACKGROUND OF THE INVENTION

This invention relates to a hydraulic shock absorber, and it more particularly relates to a shock absorber having a reserve liquid supply chamber and apparatus for indicating when the chamber is empty.

In the use of liquid shock absorbers as yaw dampers for controlling angular excursions of axles of a railway car, it has been found that if a yaw damper fails because of loss of fluid, the car may not ride properly.

Various systems have been devised for sensing and indicating fluid pressure and the like in a shock absorber, such as is disclosed in the Ellington U.S. Pat. No. 4,141,236. This patent has apparatus for electrically sensing force and velocity and indicating when a combination of these values is outside of a normal range. The Bergeron et al U.S. Pat. No. 4,499,846 discloses an axially operable indicator for attachment to a hydraulic valve to indicate whether the valve is open or closed.

These systems are not applicable to indicate, by snap action, when a reserve liquid supply chamber gradually becomes exhausted in that operation of the indicators is by a gradual change rather than a complete quick change taking affect only when fluid is exhausted from a reserve supply chamber and the chamber must be refilled.

An object of the present invention is to provide a hydraulic shock absorber having a reserve liquid supply chamber and indicator in a manner obviating some of the limitations of the prior systems.

Another object of the present invention is to provide an improved hydraulic shock absorber having a reserve liquid supply chamber and a snap acting indicator to visually indicate when the chamber is empty.

Other objects, purposes and characteristic features of the present invention will be in part obvious from the accompanying drawing, and in part, pointed out as the description of the invention progresses.

SUMMARY OF THE INVENTION

A hydraulic shock absorber is provided having a reserve liquid supply chamber containing a piston near one end thereof and a cylindrical housing adjoining the liquid supply chamber divided by a fixed abutment into an indicating portion and a piston spring biasing portion respectively, the indicating portion having an inspection opening in the cylinder near the abutment for viewing an indicator within the indicating portion. A shaft extends coaxially within the cylindrical housing and is connected at one end to the piston so as to be axially operated thereby. An indicating disc having a periphery of a distinctive color is journalled on the shaft and adapted for axial movement with the piston to indicate, when viewed through the opening, when the liquid supply chamber is empty. A substantially transparent sleeve lines a portion of the cylinder to cover the opening but yet to permit viewing of the disc when fluid in the reserve liquid supply chamber becomes exhausted. The disc is actuated by an indicator spring when the shaft moves in the direction of the abutment, which is adjoining the opening, but the disc is maintained normally at a particular position on the shaft, to prevent viewing through the opening by a detent until a force is built up by the indicator spring sufficient to actuate the disc from its normal, non-viewing position, to a position adjoining the abutment and in view through the opening.

IN THE DRAWING

The drawing is an elevational view, partly in cross section, illustrating a shock absorber according to a preferred embodiment of the present invention.

With reference to the drawing, a hydraulic shock absorber 10 is shown as having a reserve liquid supply chamber 11 that is normally filled with liquid which is maintained under pressure to adjust for leakage of liquid from the shock absorber 10, changes in volume of liquid due to temperature change, displacement due to shaft movement and volume changes within the right hand portion of shock absorber 10 (not shown) and the like. Liquid in chamber 11 is maintained under pressure by a piston 12, and a cylindrical housing 13 is provided adjoining the left hand end of the chamber 11 having a fixed abutment 14 near the central portion thereof, dividing apparatus within the cylinder 13 into indicating and piston spring biasing portions 15 and 16 respectively.

A shaft 17 extends coaxially within the cylinder housing 13, through abutment 14, and is secured to the piston 12 to be actuated axially thereby. The cylindrical housing 13 has a plurality of openings 18 therein to the left of the abutment 14 for viewing a portion of the periphery of an indicator disc 19 on the shaft 17. A sleeve 20, of transparent material, lines a portion of the cylinder 13 to cover the openings 18 for sealing against dust entering the cylinder 13, but yet permitting viewing of portions of the periphery of disc 19 through the openings. The disc 19 is slideable within the sleeve 20 on the shaft 17.

Liquid in chamber 11 is maintained under pressure by the force of a compressed coil spring 21 in piston biasing portion 16 of cylinder 13 between the abutment 14 and piston 12. In the indicating portion 20 of the cylinder 13, an indicating coil spring 22 on the left hand end of shaft 17 is for progressively increasing a force axially against the disc 19 as the piston 12 approaches the right hand end 23 of the liquid reserve chamber 11.

The disc 19 is normally maintained disposed on shaft 17 at a position with its periphery out of view through openings 18 by a detent snap ring 24, partly in a groove 25 in the periphery of disc 19, and partly in a complimentary groove 26 in the internal periphery of transparent sleeve 20, which does not move axially relative to cylinder 13.

The detent 24 keeps disc 19 from being moved axially by spring 22 until spring 22 has been fully compressed, which is adjusted to take place as the piston 12 closely approaches its limit at 23. At this time, spring 22 forces indicating disc 19 out of its detent position, and spring 22 drives disc 12, with snap action, against abutment 14, which brings the periphery 27 of disc 19, which is of a distinctive color, into direct view from the openings 18 to indicate that liquid reserve chamber 11 is substantially empty.

As the reserve liquid chamber 11 is refilled by fluid application through a suitable fitting (not shown), the piston 12 moves to the left, causing the shaft 17 to move to the left and relieve pressure of the spring 22 against the disc 19. As there is further movement to the left of piston 12, there is sufficient friction in the fitting of disc 19 on the shaft 17 to carry the disc 17 to the left along with the shaft 17 until the disc 19 has its detent wire 25 in engagement with the groove 26 of the transparent sleeve 20, wherein the disc 19 has been reset in its detent retained normal position, and further movement of piston 12 causes the disc 19 to slip on shaft 17 until the chamber 11 is fully refilled.

A conventional rubber mounting lug 28 is secured to the left hand end of cylinder 13 for attachement of the left hand end of the shock absorber to a support (not shown).

Having thus described a hydraulic shock absorber having a reserve liquid supply and liquid volume adjustment chamber and an indicator as a preferred embodiment of the present invention, it is to be understood that various modifications and alterations may be made to the specific embodiment shown, without departing from the spirit or scope of the invention.

What is claimed is:

1. A hydraulic shock absorber having a reserve liquid supply and liquid volume adjustment chamber containing a piston near one end thereof, cylindrical housing means adjoining the liquid supply chamber divided by a fixed abutment into indicating means and liquid supply spring biasing means acting on the piston respectively, the cylindrical housing means having an inspection opening near the abutment for viewing an indicator wherein improved indicating means comprises:
    (a) a shaft extending coaxially within the cylindrical housing actuated longitudinally by movement of the piston,
    (b) an indicating disc having a pheriphery of a distinctive color journalled on the shaft and adapted for axial movement with the piston to indicate, when viewed through the opening, when the liquid supply chamber is empty,
    (c) a substantially transparent sleeve lining a portion of the cylindrical housing means to cover the inspection opening,
    (d) disc spring biasing means for biasing the disc axially in the direction of the cylinder inspection opening with increasing force as the reserve liquid supply chamber becomes exhausted, and
    (e) detent means for restraining lateral movement of the disc until force of the disc biasing means has reached a point to insure snap action of the disc from a position outside of viewing area through the opening to an actuated position opposite the opening when substantially no liquid remains in the reserve liquid supply chamber.

2. A hydraulic shock absorber according to claim 1 wherein there are a plurality of inspection openings in the same plane in the cylindrical housing for viewing the periphery of the disc when in an actuated position.

3. A hydraulic shock absorber according to claim 1 wherein the detent means comprises a snap ring in a groove about the periphery of the disc cooperating with a complimentary internal groove in the substantially transparent sleeve.

4. A hydraulic shock absorber according to claim 3 wherein the indicating disc is journalled on the shaft with sufficient friction to reset the detent means upon refilling the reserve liquid supply chamber.

* * * * *